(12) United States Patent   (10) Patent No.: US 9,104,262 B2
Wang                       (45) Date of Patent: Aug. 11, 2015

(54) METHODS FOR DISPLAYING AND MOVING DATA AND SYSTEMS USING THE SAME

(71) Applicant: HTC CORPORATION, Taoyuan, Taoyuan County (TW)

(72) Inventor: Shih-Yang Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/021,810

(22) Filed: Sep. 9, 2013

(65) Prior Publication Data

US 2014/0009425 A1    Jan. 9, 2014

Related U.S. Application Data

(62) Division of application No. 12/620,324, filed on Nov. 17, 2009, now abandoned.

(30) Foreign Application Priority Data

Jul. 1, 2009 (TW) .............................. 098122212 A

(51) Int. Cl.
G06F 3/041 (2006.01)
G06F 3/0485 (2013.01)
G06F 3/0488 (2013.01)

(52) U.S. Cl.
CPC ............ *G06F 3/0416* (2013.01); *G06F 3/0485* (2013.01); *G06F 3/04883* (2013.01)

(58) Field of Classification Search
None
See application file for complete search history.

(56) References Cited

U.S. PATENT DOCUMENTS

| 2007/0150830 | A1 | 6/2007 | Ording et al. | |
| 2008/0168384 | A1* | 7/2008 | Platzer et al. | 715/784 |
| 2008/0168404 | A1 | 7/2008 | Ording | |
| 2009/0070711 | A1* | 3/2009 | Kwak et al. | 715/829 |
| 2010/0085384 | A1* | 4/2010 | Kim et al. | 345/660 |
| 2010/0175027 | A1 | 7/2010 | Young et al. | |
| 2011/0090255 | A1* | 4/2011 | Wilson et al. | 345/647 |

FOREIGN PATENT DOCUMENTS

| CN | 101356493 A | 1/2009 |
| WO | WO 2008/086218 A2 | 7/2008 |

* cited by examiner

*Primary Examiner* — Christopher R Lamb
(74) *Attorney, Agent, or Firm* — Birch, Stewart, Kolasch & Birch, LLP

(57) ABSTRACT

Methods for displaying and moving data and systems using the same are provided. First, a first movement of an object on or near a touch-sensitive display unit is detected, and in response to the first movement, data displayed in the touch-sensitive display unit is moved in a first direction. In response to an edge of the data being reached while the data is moving in the first direction and the object is still detected on or near the touch-sensitive display unit, the movement of the data is stopped. Then, a second movement of the object on or near the touch-sensitive display unit is detected, and in response to the second movement, an area beyond the edge of the data is displayed in the touch-sensitive display unit. In response to detecting that the second movement of the object is no longer on or near the touch-sensitive display unit, the data is moved in a second direction until the area beyond the edge of the data is no longer displayed in the touch-sensitive display unit.

7 Claims, 14 Drawing Sheets

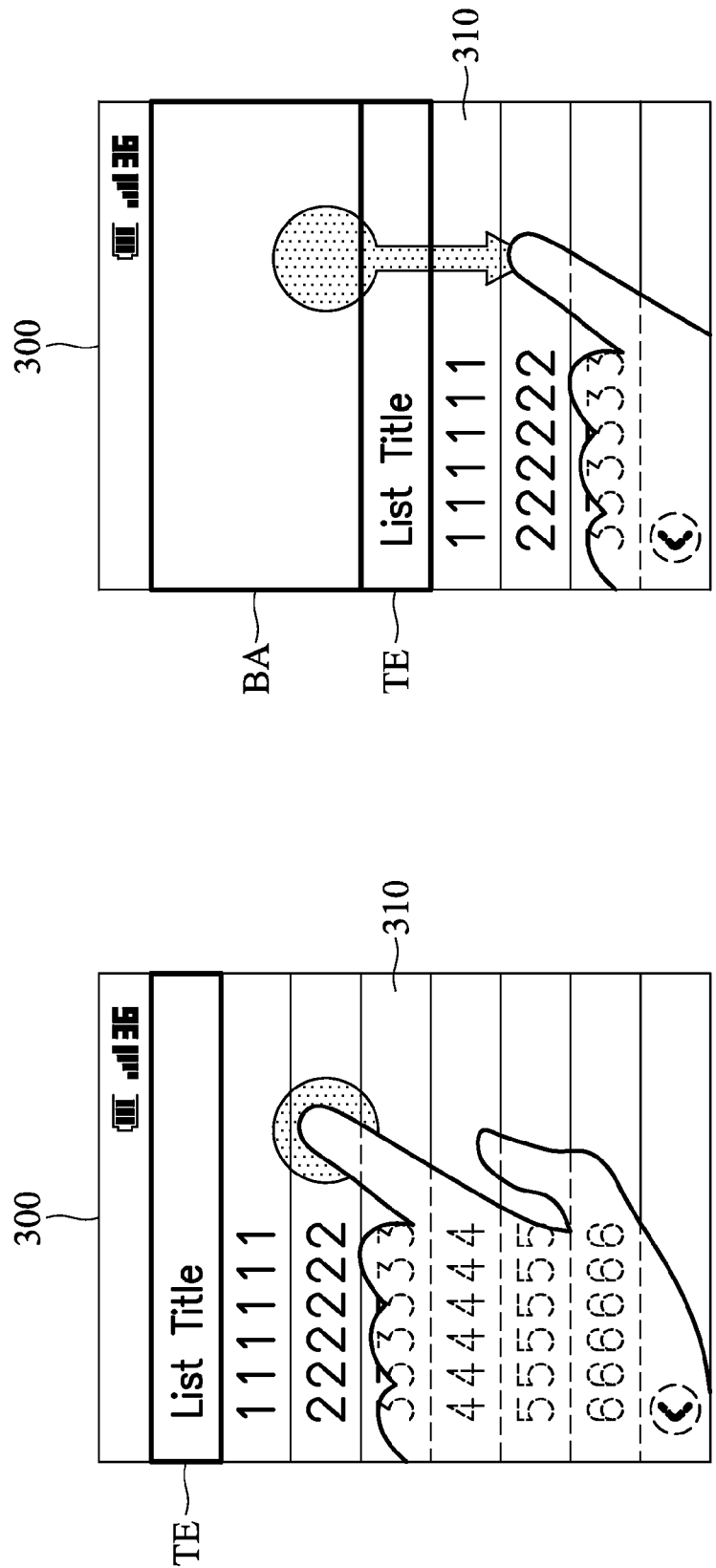

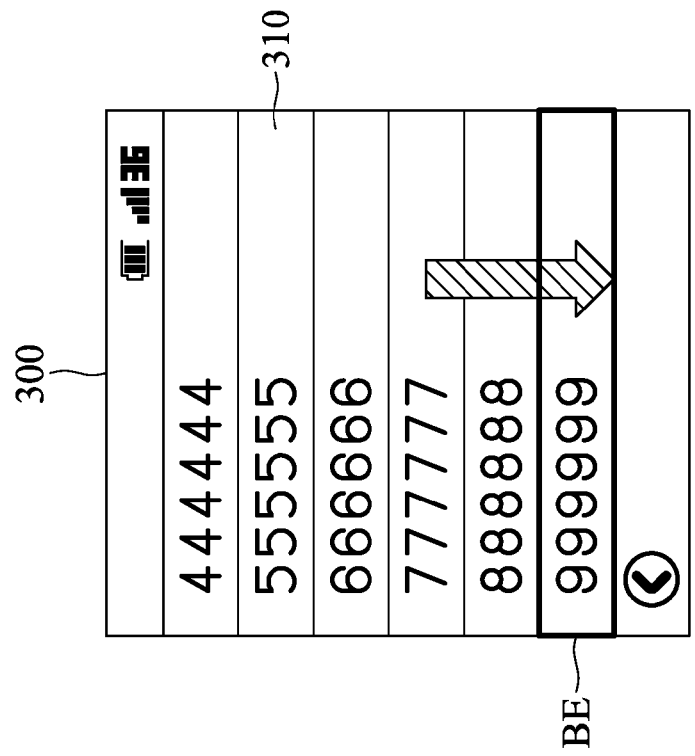
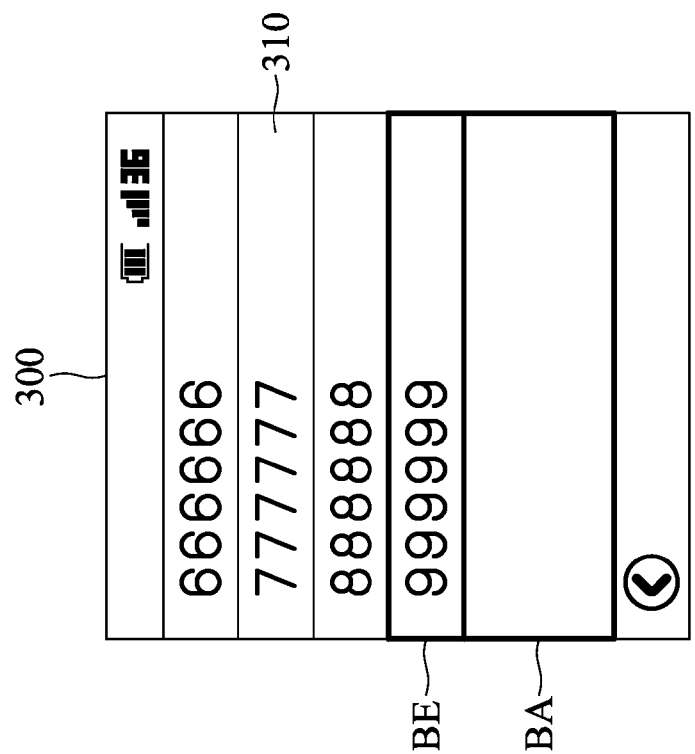

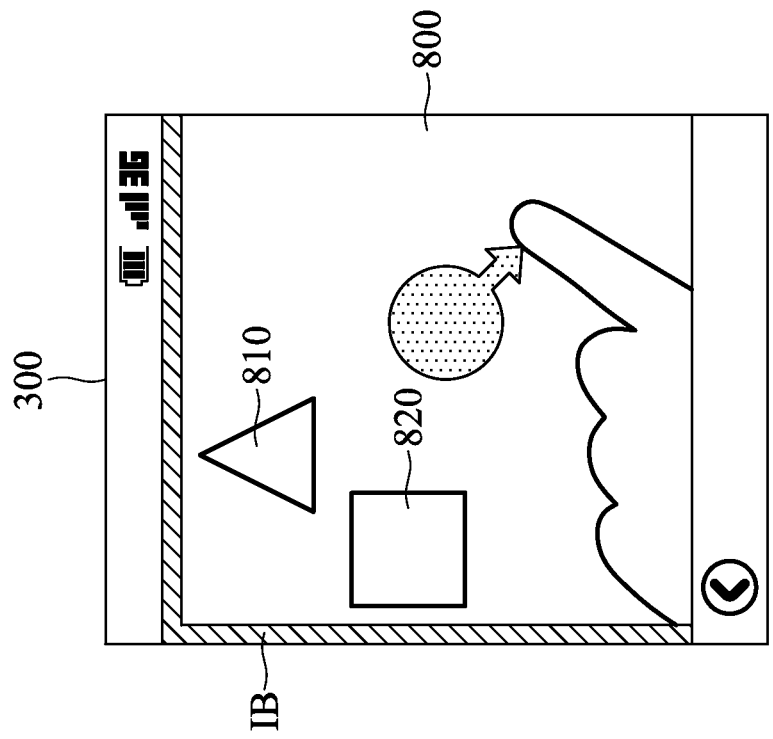
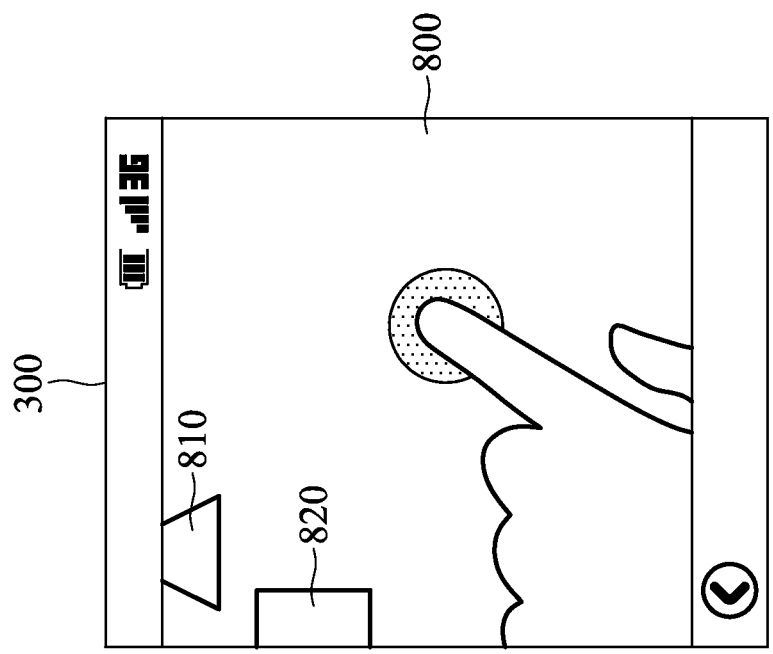
FIG. 8B
FIG. 8A

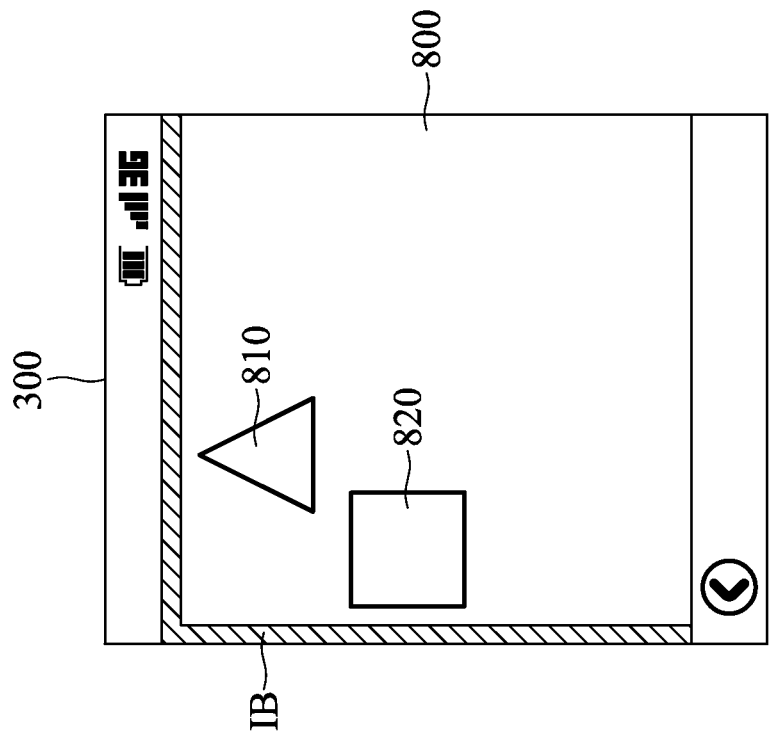
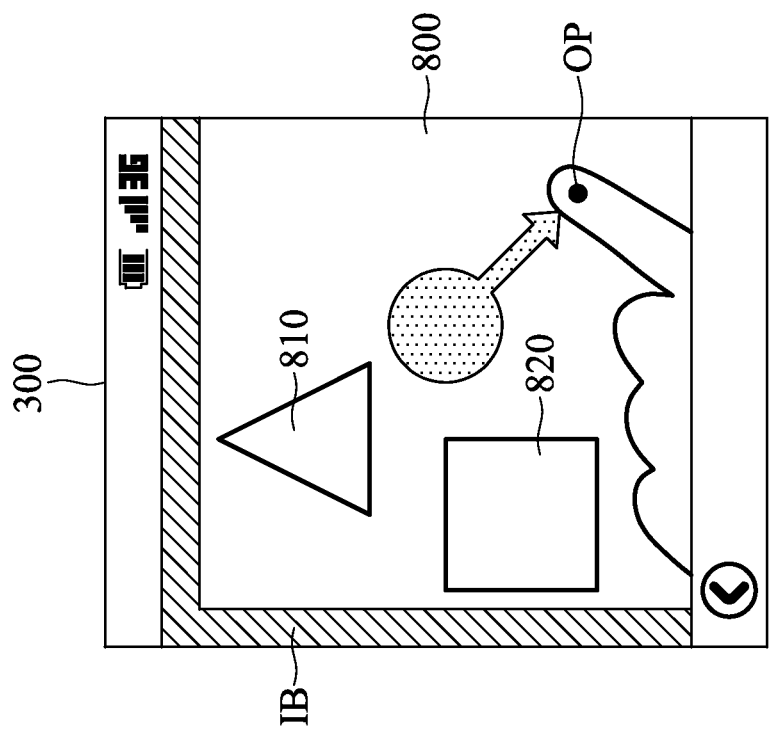
FIG. 8C
FIG. 8D

METHODS FOR DISPLAYING AND MOVING DATA AND SYSTEMS USING THE SAME

CROSS REFERENCE TO RELATED APPLICATIONS

This application is a Divisional of co-pending application Ser. No. 12/620,324, filed on Nov. 17, 2009, the entire contents of which are hereby incorporated by reference and for which priority is claimed under 35 U.S.C. §120. This application also claims priority under 35 U.S.C. §119(a) on Patent Application No. 098122212 filed in Taiwan on Jul. 1, 2009, the entire contents of which are hereby incorporated by reference.

BACKGROUND OF THE INVENTION

1. Field of the Invention

The disclosure relates generally to methods for displaying and moving data and systems using the same, and, more particularly to methods that provide edge prompts while data is displayed and moved, and systems using the same.

2. Description of the Related Art

Recently, portable devices, such as handheld devices, have become more and more technically advanced and multifunctional. For example, a handheld device may have telecommunication capabilities, e-mail message capabilities, an advanced address book management system, a media playback system, and various other functions. Due to increased convenience and functions of the devices, these devices have become necessities of life.

Currently, a handheld device may be equipped with a touch-sensitive display unit. Users can browse data and directly perform operations via the touch-sensitive display unit. Generally, the size of data to be browsed in the touch-sensitive display unit may be greater than the size of the touch-sensitive display unit. That is, the touch-sensitive display unit can only display a specific part of the data. Consequently, users have to scroll or move the data to browse other parts of the data.

In some situations, when a user scrolls data that is larger than a visible area of the touch-sensitive display unit, visual movement of the data may not be obtained if the data is continuously moved. Thus, without visual movement of the data, a user may not know when to stop for desired viewing, which makes viewing inconvenient and troublesome.

BRIEF SUMMARY OF THE INVENTION

Methods for displaying and moving data and systems using the same are provided.

In an embodiment of a method for displaying and moving data, data is displayed in a touch-sensitive display unit of an electronic device. Then, a first movement of an object on or near the touch-sensitive display unit is detected, and in response to the first movement, the data displayed in the touch-sensitive display unit is moved in a first direction. It is next determined whether the object is still detected on or near the touch-sensitive display unit and whether an edge of the data has been reached while the data is moving in the first direction. When the edge of the data is reached while the data is moving in the first direction, and the object is still detected on or near the touch-sensitive display unit, the movement of the data is stopped. Then, a second movement of the object on or near the touch-sensitive display unit is detected, and in response to the second movement, an area beyond the edge of the data is displayed in the touch-sensitive display unit. When the second movement of the object is no longer detected on or near the touch-sensitive display unit, the data is moved in a second direction until the area beyond the edge of the data is no longer displayed in the touch-sensitive display unit.

An embodiment of a system for displaying and moving data includes a touch-sensitive display unit, and a processing unit. The touch-sensitive display unit displays data. The processing unit detects a first movement of an object on or near the touch-sensitive display unit, and in response to the first movement, moves the data displayed in the touch-sensitive display unit in a first direction. The processing unit determines whether the object is still detected on or near the touch-sensitive display unit, and whether an edge of the data has been reached while the data is moving in the first direction. When the edge of the data is reached while the data is moving in the first direction, and the object is still detected on or near the touch-sensitive display unit, the processing unit stops the movement of the data. Then, the processing unit detects a second movement of the object on or near the touch-sensitive display unit, and in response to the second movement, displays an area beyond the edge of the data in the touch-sensitive display unit. When the second movement of the object is no longer detected on or near the touch-sensitive display unit, the processing unit moves the data in a second direction until the area beyond the edge of the data is no longer displayed in the touch-sensitive display unit.

In an embodiment of a method for displaying and moving data, data is displayed in a touch-sensitive display unit of an electronic device. Then, a flick of an object on or near the touch-sensitive display unit is detected, and in response to the detected flick, the data displayed in the touch-sensitive display unit is moved in a first direction, wherein a scrolling speed corresponding to the movement of the data is gradually decreased from a specific speed. Then, it is determined whether an edge of the data has been reached while the data is moving in the first direction, and whether the scrolling speed corresponding to the movement of the data is zero when the edge of the data is reached while the data is moving in the first direction. When the edge of the data is reached while the data is moving in the first direction, and the scrolling speed corresponding to the movement of the data is not zero when the edge of the data is reached, an area beyond the edge of the data is displayed in the touch-sensitive display unit. After the area beyond the edge of the data is displayed in the touch-sensitive display unit, the data is moved in a second direction until the area beyond the edge of the data is no longer displayed in the touch-sensitive display unit.

An embodiment of a system for displaying and moving data includes a touch-sensitive display unit, and a processing unit. The touch-sensitive display unit displays data. The processing unit detects a flick of an object on or near the touch-sensitive display unit, and in response to the detected flick, moves the data displayed in the touch-sensitive display unit in a first direction, wherein a scrolling speed corresponding to the movement of the data is gradually decreased from a specific speed. Then, the processing unit determines whether an edge of the data has been reached while the data is moving in the first direction, and whether the scrolling speed corresponding to the movement of the data is zero when the edge of the data is reached while the data is moving in the first direction. When the edge of the data is reached while the data is moving in the first direction, and the scrolling speed corresponding to the movement of the data is not zero when the edge of the data is reached, the processing unit displays an area beyond the edge of the data in the touch-sensitive display unit. After the area beyond the edge of the data is displayed in the touch-sensitive display unit, the processing unit moves the data in a second direction until the area beyond the edge of the data is no longer displayed in the touch-sensitive display unit.

In an embodiment of a method for displaying and moving data, data is displayed in a touch-sensitive display unit of an electronic device. Then, a movement of an object on or near the touch-sensitive display unit is detected, and in response to the first movement, the data displayed in the touch-sensitive display unit is moved in a movement direction of the object. It is determined whether the object is still detected on or near the touch-sensitive display unit, and whether an edge of the data has been reached while the data is moving. When the edge of the data is reached while the data is moving, and the object is still detected on or near the touch-sensitive display unit, the data is deformed according to the movement direction of the object, and displayed in the touch-sensitive display unit. Then, when the movement of the object is no longer detected on or near the touch-sensitive display unit, the deformed data is restored and displayed in the touch-sensitive display unit.

An embodiment of a system for displaying and moving data includes a touch-sensitive display unit, and a processing unit. The touch-sensitive display unit displays data. The processing unit detects a movement of an object on or near the touch-sensitive display unit, and in response to the movement, moves the data displayed in the touch-sensitive display unit in a movement direction of the object. The processing unit determines whether the object is still detected on or near the touch-sensitive display unit, and whether an edge of the data has been reached while the data is moving. When the edge of the data is reached while the data is moving, and the object is still detected on or near the touch-sensitive display unit, the processing unit deforms the data according to the movement direction of the object, and displays the deformed data in the touch-sensitive display unit. When the movement of the object is no longer detected on or near the touch-sensitive display unit, the processing unit restores the deformed data, and displays the data in the touch-sensitive display unit.

Methods for displaying and moving data and systems using the same may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein:

FIGS. 3A~3G are schematic diagrams illustrating an embodiment of an example of data display and movement of the invention;

FIGS. 5A~5D are schematic diagrams illustrating an embodiment of an example of data display and movement of the invention;

FIGS. 7A~7D are schematic diagrams illustrating an embodiment of an example of data display and movement of the invention; and FIGS. 8A~8D are schematic diagrams illustrating an embodiment of an example of data display and movement of the invention.

DETAILED DESCRIPTION OF THE INVENTION

Methods for displaying and moving data and systems using the same are provided.

Figure 1:
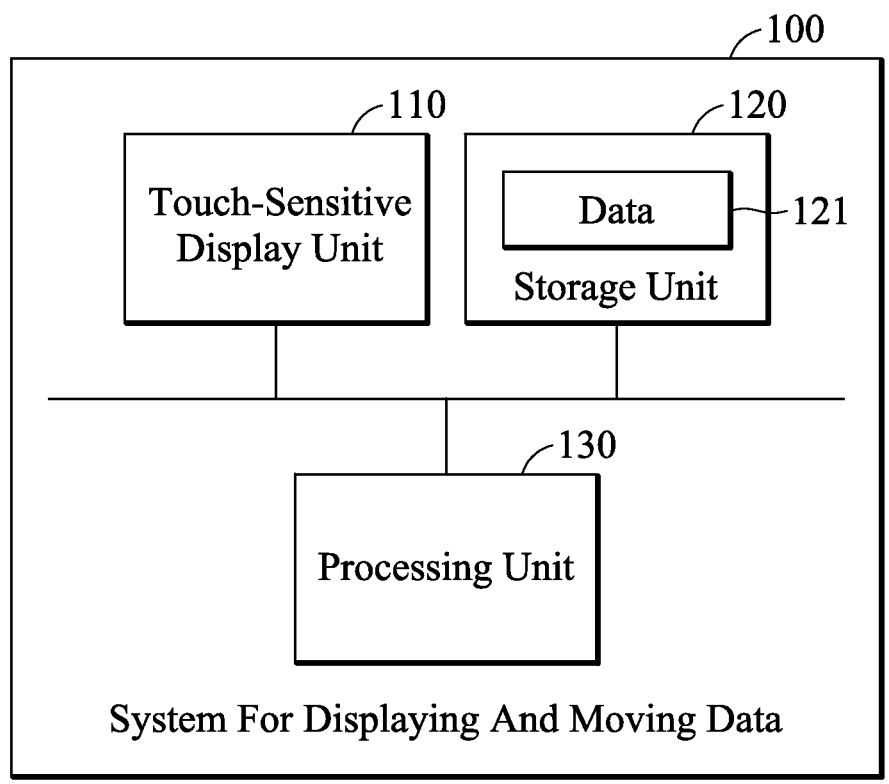
FIG. 1 is a schematic diagram illustrating an embodiment of a system for displaying and moving data of the invention.

FIG. 1 is a schematic diagram illustrating an embodiment of a system for displaying and moving data of the invention. The system for displaying and moving data 100 can be used in an electronic device, such as a portable device comprising handheld devices such as a PDA (Personal Digital Assistant), a smart phone, a mobile phone, a MID (Mobile Internet Device, MID), and a Netbook.

The system for displaying and moving data 100 comprises a touch-sensitive display unit 110, a storage unit 120, and a processing unit 130. The touch-sensitive display unit 110 is a screen integrated with a touch-sensitive device (not shown). The touch-sensitive device has a touch-sensitive surface comprising sensors in at least one dimension to detect contact and movement of an input tool (object), such as a stylus or finger on the touch-sensitive surface. The touch-sensitive display unit 110 can display related data, and/or related figures and interfaces. The storage unit 120 comprises data 121, which can be provided to the touch-sensitive display unit 110 for display. In some embodiments, the data 121 may be a list to be browsed in the touch-sensitive display unit 110 in one dimension, such as in a horizontal direction or a vertical direction. The list may comprise a plurality of items. In some embodiments, the data 121 may be data, such as an image, a webpage, a text file, an email, and/or a transparency to be browsed in the touch-sensitive display unit 110 in multiple dimensions. The processing unit 130 performs the method for displaying and moving data of the invention, which will be discussed further in the following paragraphs.

Figure 2:
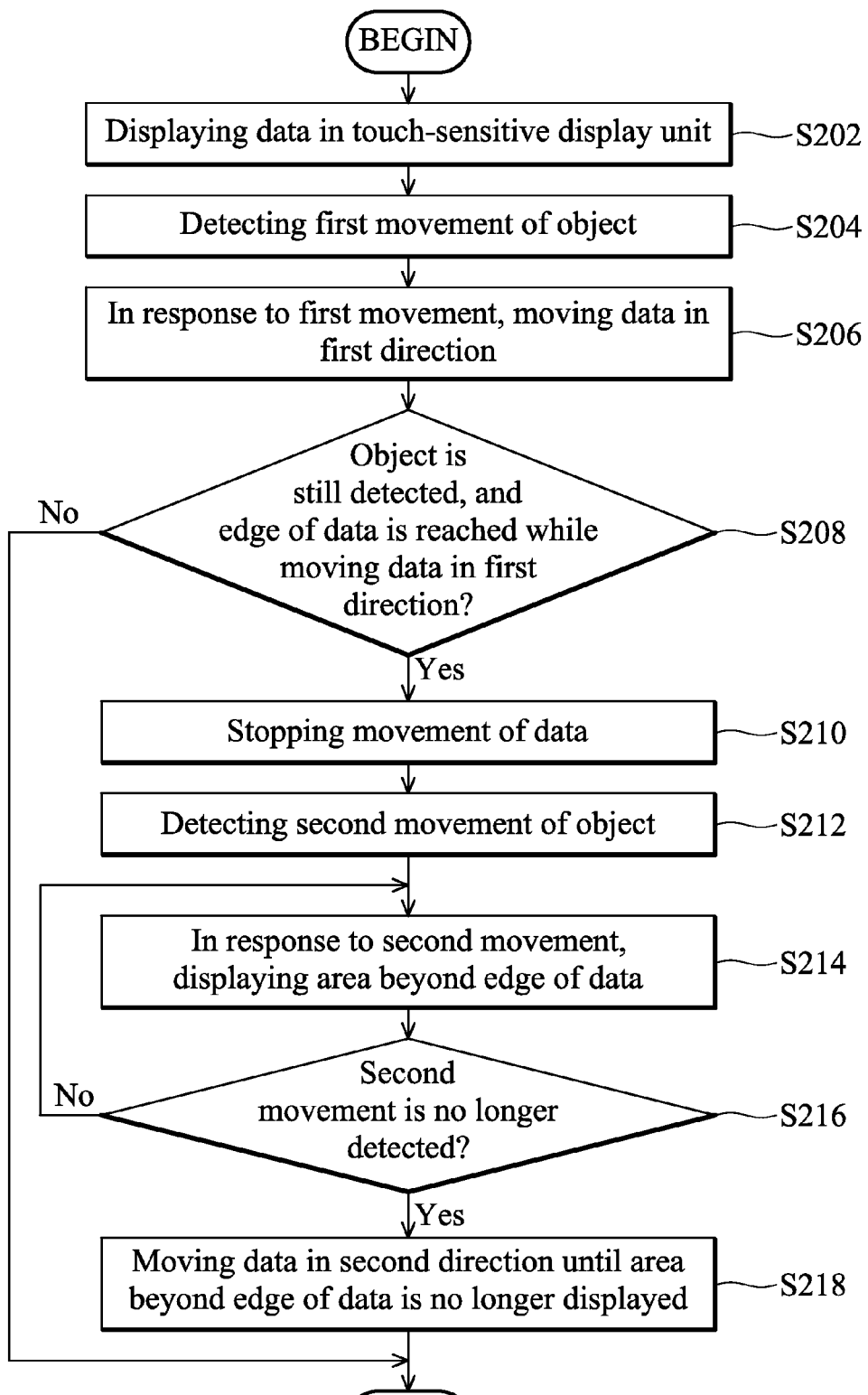
FIG. 2 is a flowchart of an embodiment of a method for displaying and moving data of the invention.

FIG. 2 is a flowchart of an embodiment of a method for displaying and moving data of the invention. The method for displaying and moving data can be used for an electronic device, such as a portable device comprising handheld devices such as a PDA, a smart phone, a mobile phone, a MID, and a Netbook.

In step S202, the touch-sensitive display unit of the electronic device displays data. In some embodiments, the data may be a list having a plurality of items, which can be browsed in the touch-sensitive display unit in one dimension. In step S204, a first movement of an object, such as a finger or a stylus on or near the touch-sensitive display unit is detected. In step S206, in response to the first movement, the data displayed in the touch-sensitive display unit is moved in a first direction. It is understood that, in some embodiments, the movement direction of the data can be same with the movement direction of the object. In step S208, it is determined whether the object is still detected on or near the touch-sensitive display unit, and whether an edge of the data has been reached while the data is moving in the first direction. When the edge of the data is not reached while the data is moving in the first direction, or the object is not still detected on or near the touch-sensitive display unit (No in step S208), the procedure is completed. It is noted that, when the edge of the data is not reached while the data is moving in the first direction, and the object is still detected on or near the touch-sensitive display unit, the data can continue to be moved in the first direction. When the edge of the data is reached while the data is moving in the first direction, and the object is still detected on or near the touch-sensitive display unit (Yes in step S208), in step S210, the movement of the data is stopped.

That is, when the edge of the data is reached, the data displayed in the touch-sensitive display unit is not changed even the object further moves along the first direction. Thereafter, in step S212, a second movement of the object on or near the touch-sensitive display unit is detected. The direction of the second movement and the direction of the first movement can be the same. It is understood that, before the execution of step S212, it is determined whether the first movement of the object is no longer detected on or near the touch-sensitive display unit. That is, the object must first leave the touch-sensitive display unit, and then move close to or contact the touch-sensitive display unit again. In step S214, in response to the second movement, an area beyond the edge of the data is displayed in the touch-sensitive display unit. It is noted that, the area beyond the edge of the data can be an empty space, or any area which can be visually distinguished from the data. It is understood that, in some embodiments, the size of the area beyond the edge of the data can be adjusted according to the second movement. For example, when the object continues to move along the first direction, the area beyond the edge of the data becomes large. Then, in step S216, it is determined whether the second movement of the object is no longer detected on or near the touch-sensitive display unit. That is, it is determined whether the object leaves the touch-sensitive display unit. When the second movement of the object is still detected on or near the touch-sensitive display unit (No in step S216), the procedure returns to step S214. When the second movement of the object is no longer detected on or near the touch-sensitive display unit (Yes in step S216), in step S218, the data is moved in a second direction until the area beyond the edge of the data is no longer displayed in the touch-sensitive display unit. It is noted that, the second direction may be opposite from the first direction.

Figure 3B:
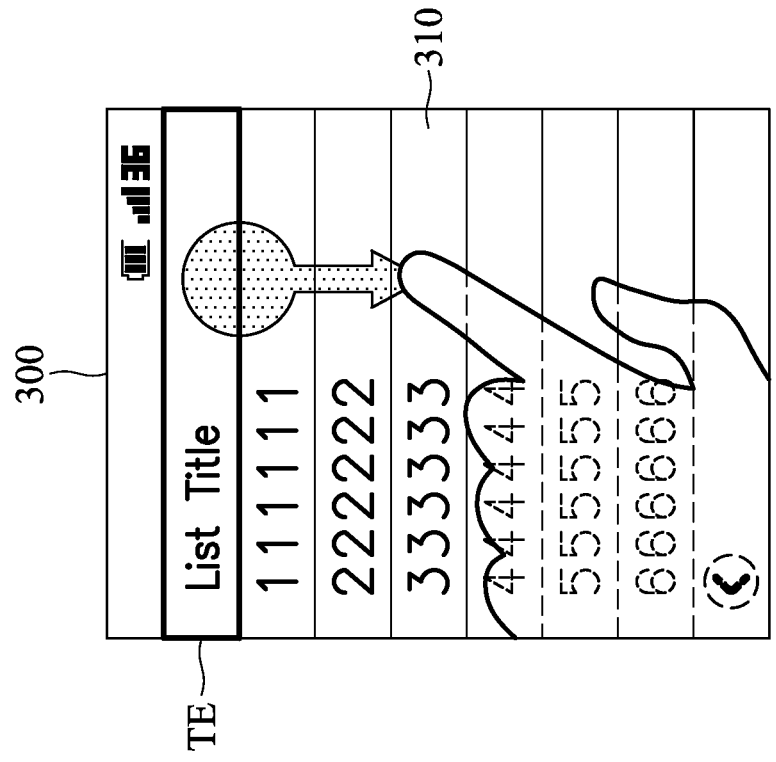
Figure 3A:
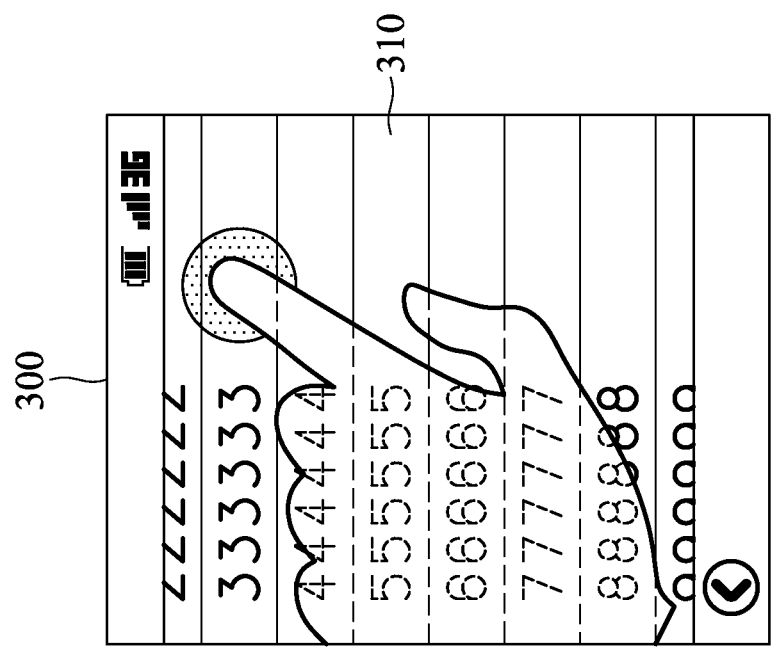
Figure 3C:
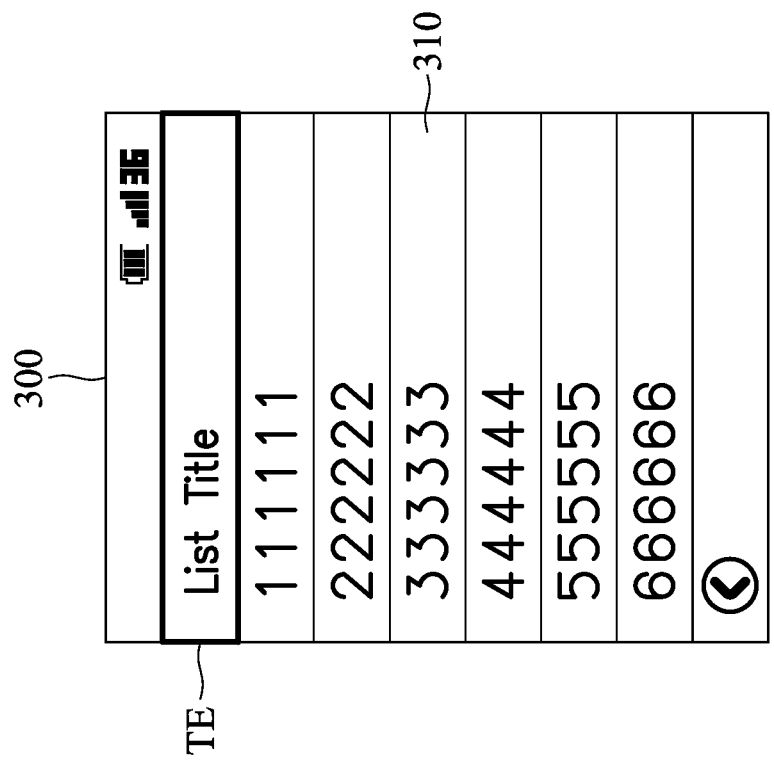
Figure 3D:
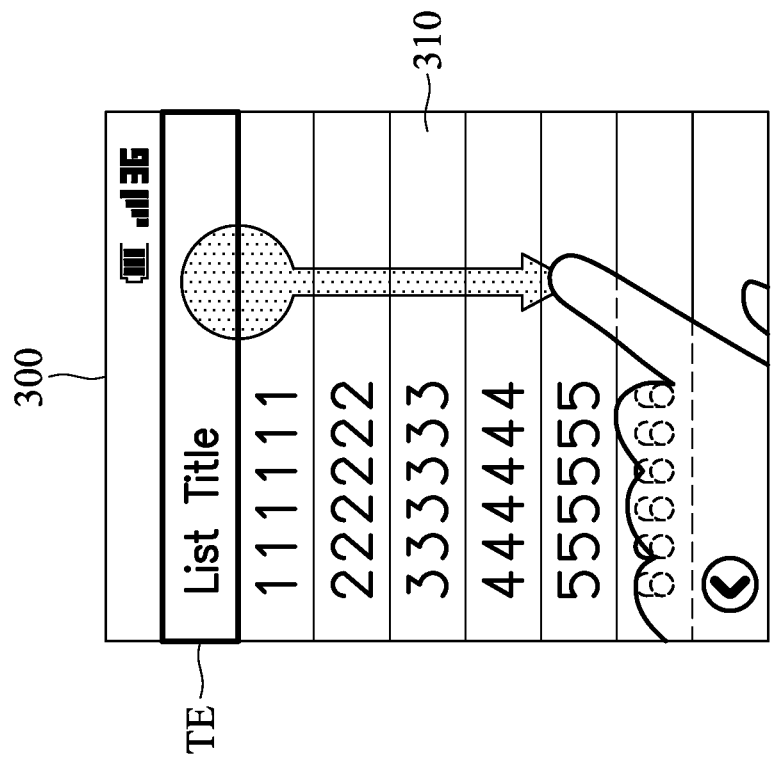
Figure 3G:
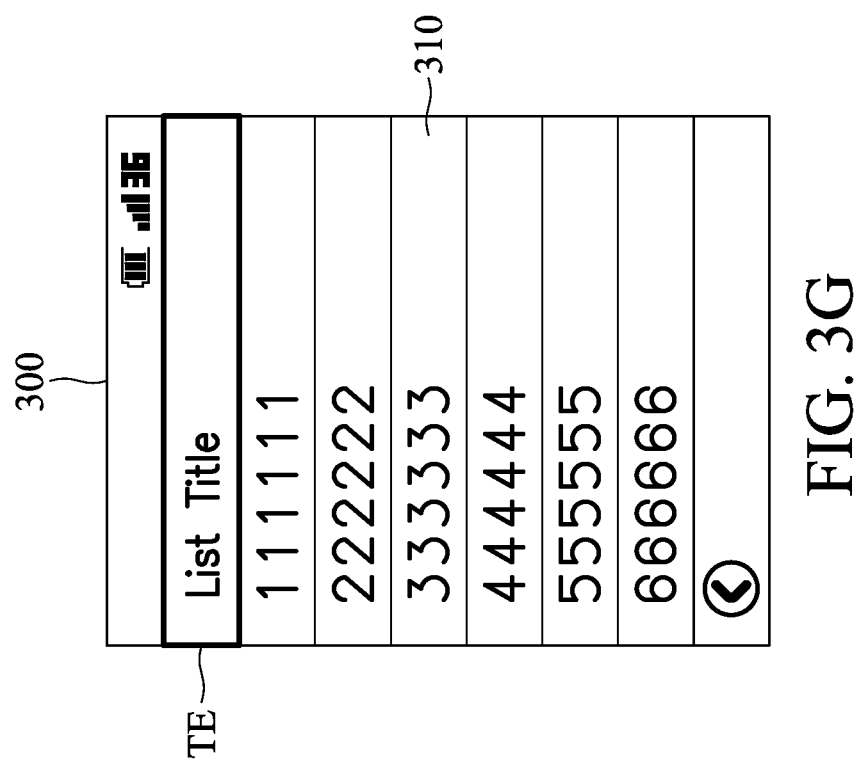

Following is an example. A list 310 is displayed in a touch-sensitive display unit 300. A finger, being close to or contacting the touch-sensitive display unit 300 may move the list 310 displayed in the touch-sensitive display unit 300, as shown in FIG. 3A. When the finger moves downward, the list 310 displayed in the touch-sensitive display unit 300 also moves downward, such that an upper edge TE of the list 310 appears, as shown in FIG. 3B. When the finger continues to move downward, the list 310 displayed in the touch-sensitive display unit 300 that is moving is stopped. That is, the list 310 displayed in the touch-sensitive display unit 300 is held at the edge of the list 310, as shown in FIG. 3C. Then, the finger can leave the touch-sensitive display unit 300, as shown in FIG. 3D, and move close to or contact the touch-sensitive display unit 300 again, as shown in FIG. 3E. Thereafter, when the finger further moves downward, an area BA beyond the upper edge TE of the list 310 is displayed in the touch-sensitive display unit 300, as shown in FIG. 3F. After the finger leaves the touch-sensitive display unit 300, the list 310 displayed in the touch-sensitive display unit 300 is moved upward until the area BA beyond the upper edge TE of the list 310 is no longer displayed in the touch-sensitive display unit 300, as shown in FIG. 3G.

Figure 4:
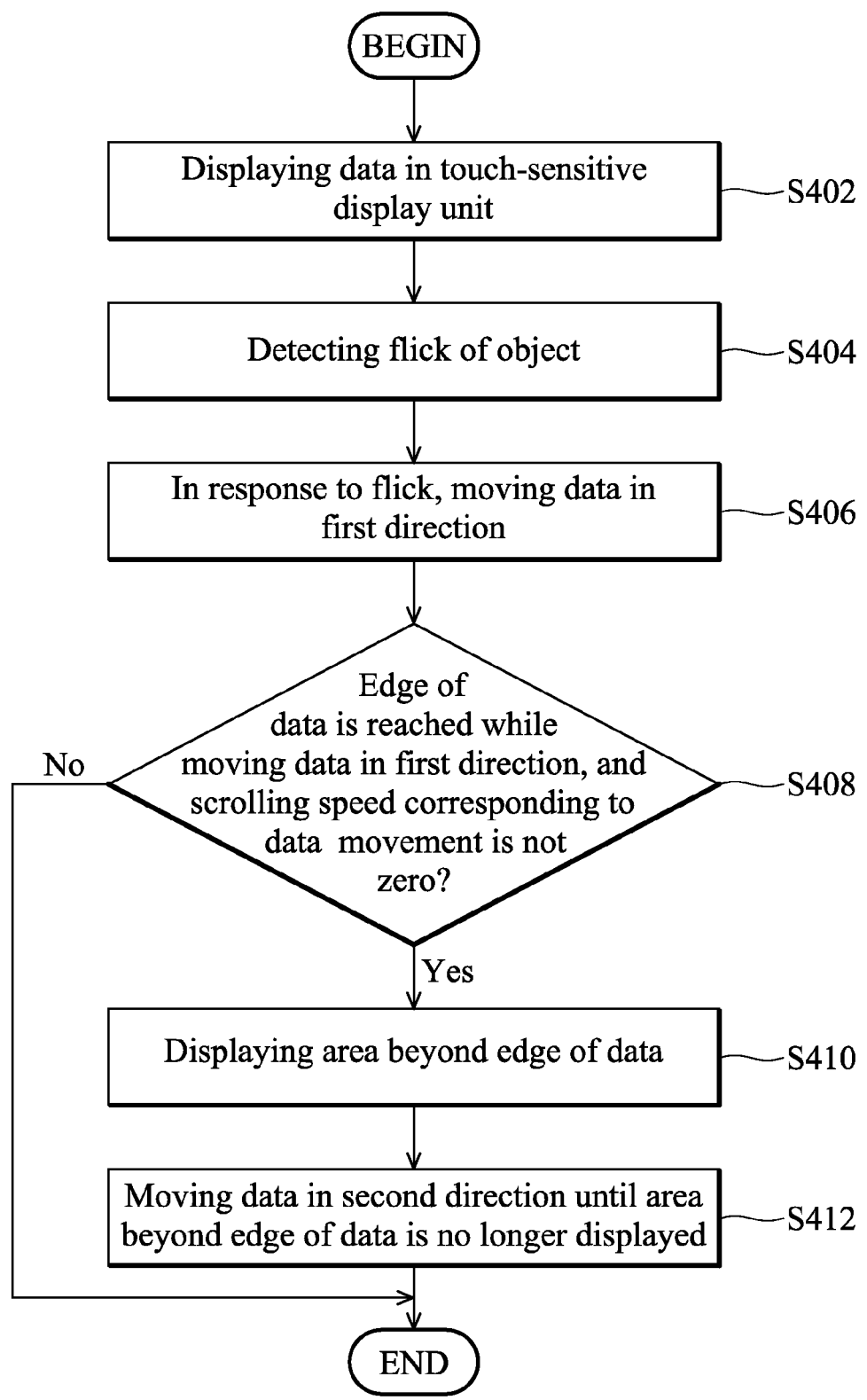
FIG. 4 is a flowchart of another embodiment of a method for displaying and moving data of the invention.

FIG. 4 is a flowchart of another embodiment of a method for displaying and moving data of the invention. The method for displaying and moving data can be used for an electronic device, such as a portable device comprising handheld devices such as a PDA, a smart phone, a mobile phone, a MID, and a Netbook.

In step S402, the touch-sensitive display unit of the electronic device displays data. In some embodiments, the data may be a list having a plurality of items, which can be browsed in the touch-sensitive display unit in one dimension. In step S404, a flick of an object, such as a finger or a stylus on or near the touch-sensitive display unit is detected. The flick of the object means the object is first close to or contacts the touch-sensitive display unit, and then moves and leaves the touch-sensitive display unit. The detection of the flick of the object is performed by detecting a contact and a movement of the object on or near the touch-sensitive display unit, and determining whether the object is no longer on or near the touch-sensitive display unit. In step S406, in response to the detected flick, the data displayed in the touch-sensitive display unit is moved in a first direction. It is understood that, in some embodiments, the movement direction of the data can be same with the flick direction of the object. Additionally, a scrolling speed corresponding to the movement of the data is gradually decreased from a specific speed, and the specific speed may be the movement speed of the object on or near the touch-sensitive display unit, or the specific speed can be determined according to the movement speed of the object on or near the touch-sensitive display unit. In step S408, it is determined whether an edge of the data has been reached while the data is moving in the first direction, and whether the scrolling speed corresponding to the movement of the data is zero when the edge of the data is reached. When the edge of the data is not reached while the data is moving in the first direction, or the scrolling speed corresponding to the movement of the data is zero when the edge of the data is reached (No in step S408), the procedure is completed. It is noted that, when the edge of the data is not reached while the data is moving in the first direction, and the scrolling speed corresponding to the movement of the data is not zero, the data continues to be moved along the first direction. When the edge of the data is reached while the data is moving in the first direction, and the scrolling speed corresponding to the movement of the data is not zero when the edge of the data is reached (Yes in step S408), in step S410, an area beyond the edge of the data is displayed in the touch-sensitive display unit. Similarly, the area beyond the edge of the data can be an empty space, or any area which can be visually distinguished from the data. It is understood that, in some embodiments, the size of the area beyond the edge of the data can be determined according to the scrolling speed corresponding to the movement of the data when the edge of the data is reached, and the area is gradually unfolded and displayed according to the scrolling speed corresponding to the movement of the data when the edge of the data is reached. That is, when the area is completely unfolded, the scrolling speed corresponding to the movement of the data is zero. After the area beyond the edge of the data is displayed in the touch-sensitive display unit, in step S412, the data is moved in a second direction until the area beyond the edge of the data is no longer displayed in the touch-sensitive display unit. It is noted that, the second direction may be opposite from the first direction.

Figure 5B:
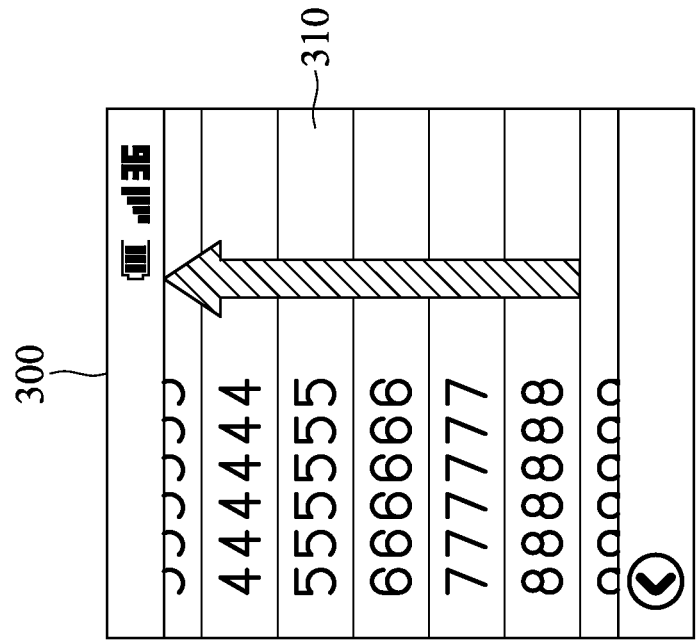
Figure 5A:
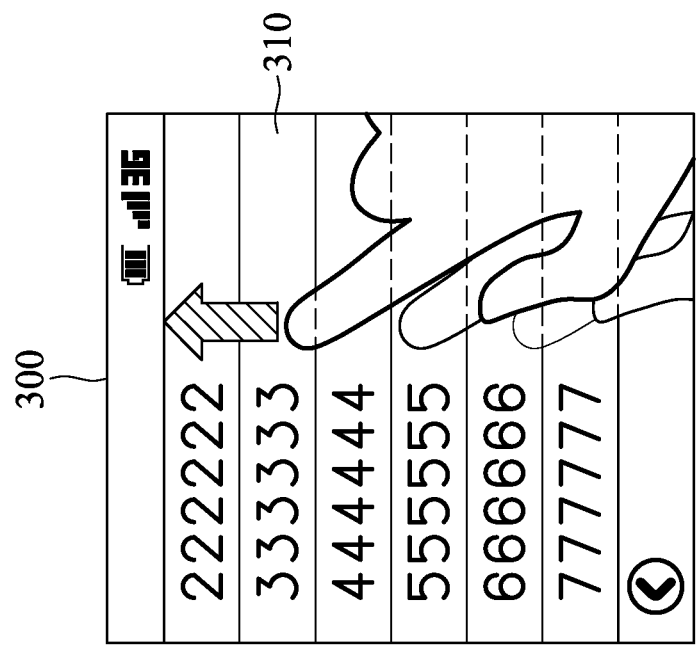

Following is an example. A list 310 is displayed in a touch-sensitive display unit 300. A finger close to or contacting the touch-sensitive display unit 300 flicks upward, as shown in FIG. 5A. When the finger flicks upward, the list 310 displayed in the touch-sensitive display unit 300 also moves upward, as shown in FIG. 5B. When a lower edge BE of the list 310 appears while moving the list 310, and the scrolling speed corresponding to the movement of the list 310 at the time is not zero, an area BA beyond the lower edge BE of the list 310 is displayed in the touch-sensitive display unit 300, as shown in FIG. 5C. After the area BA is displayed or the scrolling speed is zero, the list 310 displayed in the touch-sensitive display unit 300 is moved downward until the area BA beyond the lower edge BE of the list 310 is no longer displayed in the touch-sensitive display unit 300, as shown in FIG. 5D.

Figure 6:
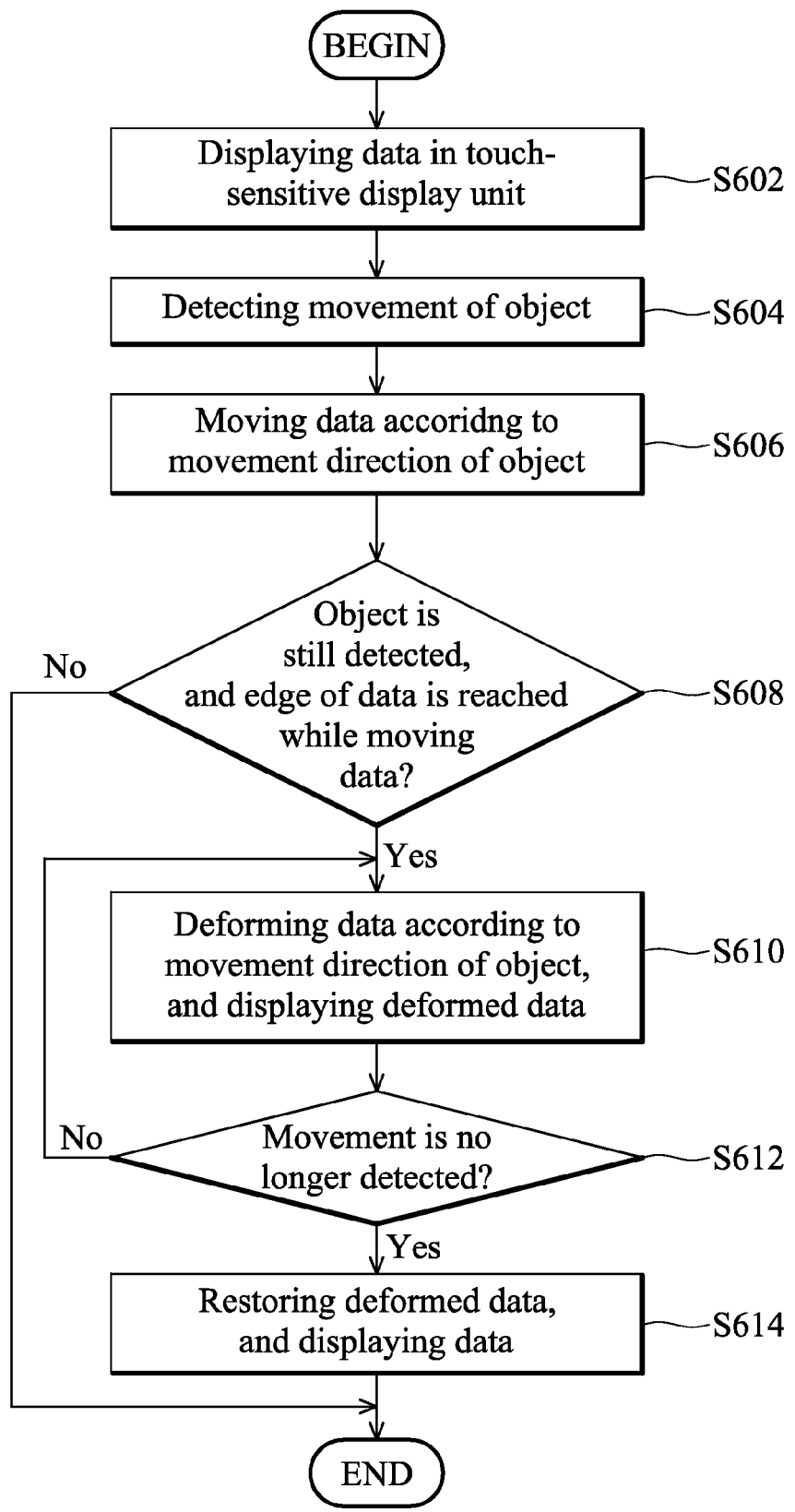
FIG. 6 is a flowchart of a further embodiment of a method for displaying and moving data of the invention.

FIG. 6 is a flowchart of a further embodiment of a method for displaying and moving data of the invention. The method for displaying and moving data can be used for an electronic device, such as a portable device comprising handheld devices such as a PDA, a smart phone, a mobile phone, a MID, and a Netbook.

In step S602, the touch-sensitive display unit of the electronic device displays data. In some embodiments, the data may be a list having a plurality of items, which can be browsed in the touch-sensitive display unit in one dimension. In some embodiments, the data may be an image, a webpage, a text file, an email, or a transparency to be browsed in the touch-sensitive display unit in multiple dimensions. In step S604, a movement of an object, such as a finger or a stylus on or near the touch-sensitive display unit is detected, and in step S606, in response to the movement, the data displayed in the touch-sensitive display unit is moved according to a movement direction of the object. In step S608, it is determined whether the object is still detected on or near the touch-sensitive display unit, and whether an edge of the data has been reached while the data is moving. When the edge of the data is not reached while the data is moving, or the object is no longer detected on or near the touch-sensitive display unit (No in step S608), the procedure is completed. It is noted that, when the edge of the data is not reached while the data is moving, and the object is still detected on or near the touch-sensitive display unit, the data can continue to be moved according to the movement direction of the object. When the edge of the data is reached while the data is moving, and the object is still detected on or near the touch-sensitive display unit (Yes in step S608), in step S610, the data is deformed according to the movement direction of the object, and displayed in the touch-sensitive display unit. It is understood that, in some embodiments, a specific region from the edge of the data to a specific position corresponding to the object on or near the touch-sensitive display unit is expanded or magnified according to the movement direction of the object. Additionally, in some embodiments, the degree of expansion or magnification for the specific region can be determined according to a movement distance of the object after the edge of the data is reached. Then, in step S612, it is determined whether the movement of the object is no longer detected on or near the touch-sensitive display unit. That is, it is determined whether the object leaves the touch-sensitive display unit. When the movement of the object is still detected on or near the touch-sensitive display unit (No in step S612), the procedure returns to step S610. When the movement of the object is no longer detected on or near the touch-sensitive display unit (Yes in step S612), in step S614, the deformed data is restored and displayed in the touch-sensitive display unit.

Figure 7B:
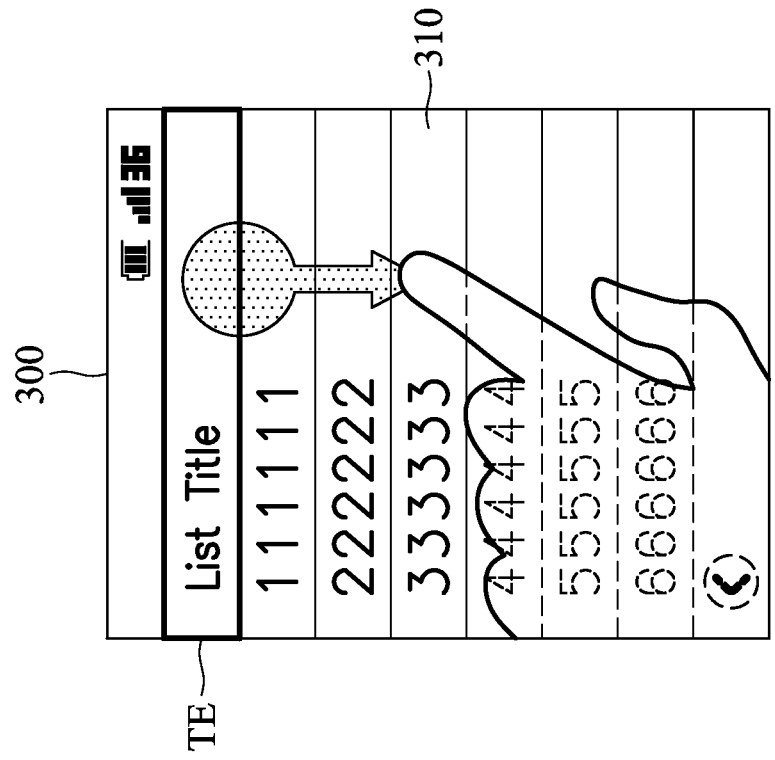
Figure 7A:
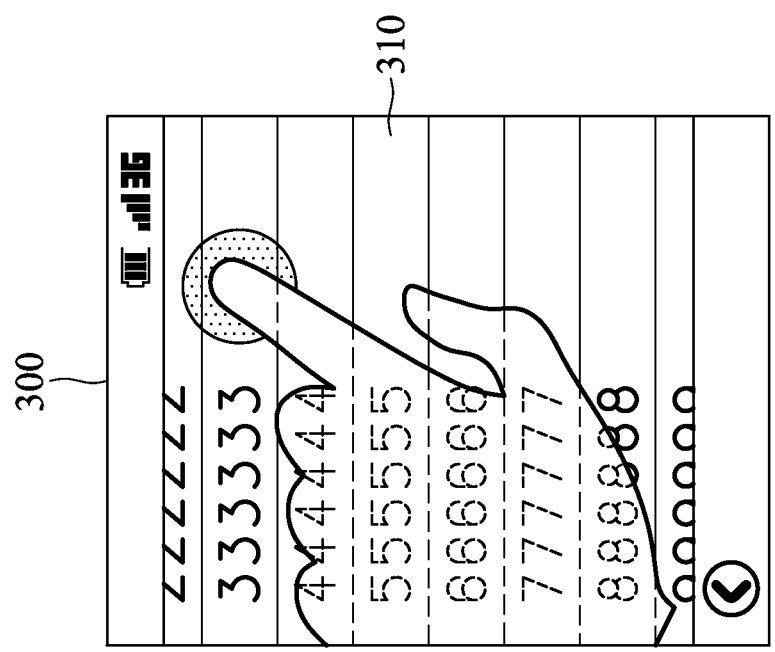
Figures 7C, 7D:
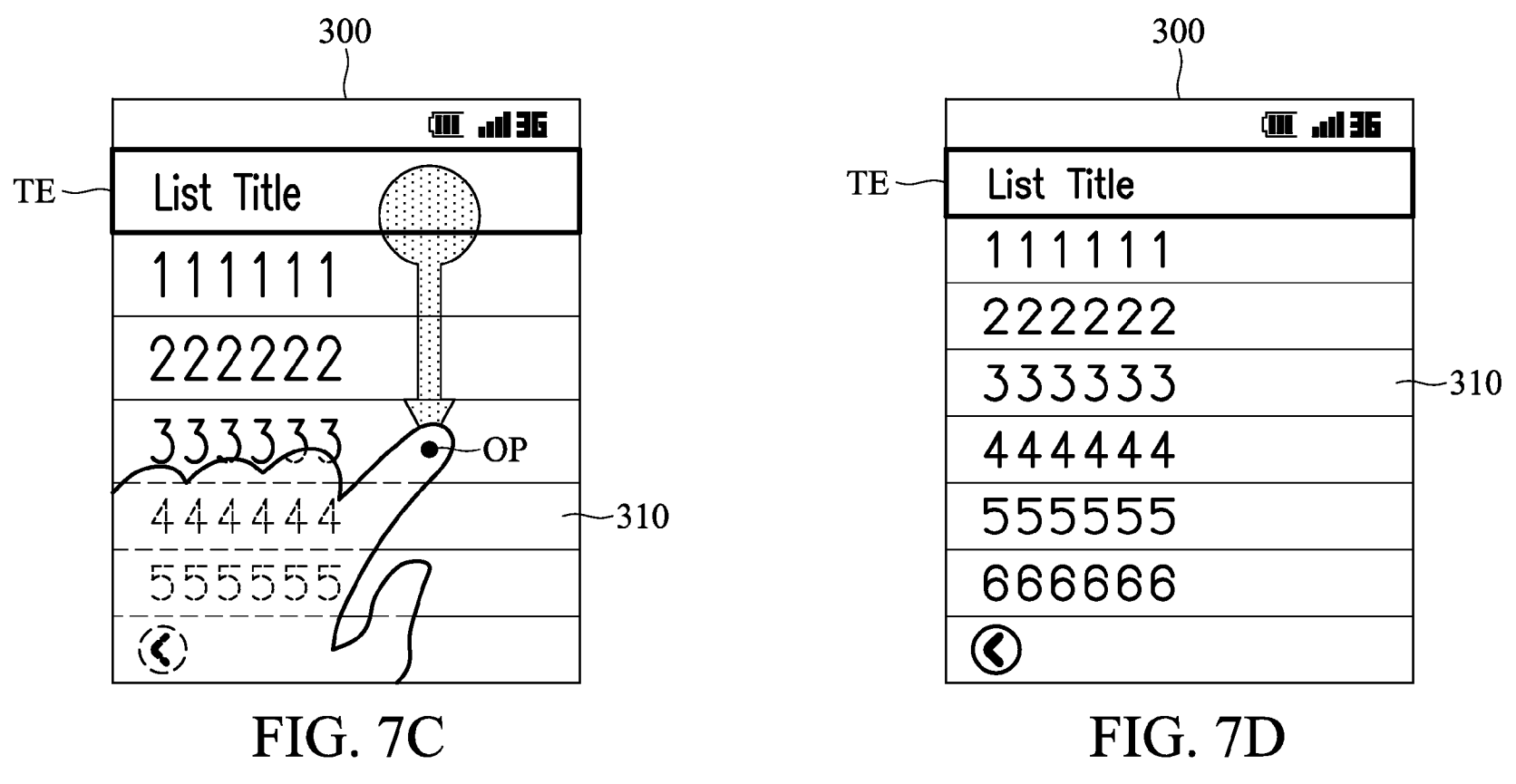

Following is an example. A list 310 is displayed in a touch-sensitive display unit 300. A finger close to or contacting the touch-sensitive display unit 300 moves the list 310 displayed in the touch-sensitive display unit 300, as shown in FIG. 7A. When the finger moves downward, the list 310 displayed in the touch-sensitive display unit 300 also moves downward, such that an upper edge TE of the list 310 appears, as shown in FIG. 7B. When the finger continues to move downward, the list 310 displayed in the touch-sensitive display unit 300 is deformed, as shown in FIG. 7C, wherein the specific region from the upper edge TE of the list 310 to a specific position OP corresponding to the finger on or near the touch-sensitive display unit 300 is enlarged. After the finger leaves the touch-sensitive display unit 300, the deformed list 310 is restored, as shown in FIG. 7D. In another example, an image 800 is displayed in a touch-sensitive display unit 300. The image 800 includes a triangle 810 and a rectangle 820. A finger close to or contacting the touch-sensitive display unit 300 moves the image 800 displayed in the touch-sensitive display unit 300, as shown in FIG. 8A. When the finger moves to the bottom right of the touch-sensitive display unit 300, the image 800 displayed in the touch-sensitive display unit 300 also accordingly moves, such that an edge IB of the image 800 appears, as shown in FIG. 8B. When the finger continues to move to the bottom right of the touch-sensitive display unit 300, the image 800 displayed in the touch-sensitive display unit 300 is deformed, as shown in FIG. 8C, wherein the triangle 810 and the rectangle 820 are respectively enlarged. After the finger leaves the touch-sensitive display unit 300, the deformed image 800 is restored, as shown in FIG. 8D.

Therefore, the methods for displaying and moving data and systems using the same can provide edge prompts while data is displayed and moved to an edge.

Methods for displaying and moving data and systems using the same, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for displaying and moving data for use in an electronic device, comprising:
   displaying data in a touch-sensitive display unit of the electronic device;
   detecting a movement of an object on or near the touch-sensitive display unit;
   in response to the movement, moving the data displayed in the touch-sensitive display unit in a movement direction of the object;
   determining whether the object is still detected on or near the touch-sensitive display unit, and whether an edge of the data has been reached while the data is moving;
   detecting if the object is still on or near the touch-sensitive display unit when the edge of the data is reached while the data is moving;
   only when the edge of the data is reached and the object is still detected on or near the touch-sensitive display unit, deforming the data according to the movement direction of the object, and displaying the deformed data in the touch-sensitive display unit, wherein the deformation of the data is performed by enlarging a specific region from the edge of the data to a specific position corresponding to the object on or near the touch-sensitive display unit according to the movement direction of the object;

detecting if the object is still on or near the touch-sensitive display unit after displaying the deformed data in the touch-sensitive display unit; and only when the movement of the object is no longer detected on or near the touch-sensitive display unit, restoring the deformed data, and displaying the data in the touch-sensitive display unit.

2. The method of claim 1, wherein the specific region is expanded or magnified according to a movement distance of the object after the edge of the data is reached.

3. The method of claim 1, wherein the data comprises a list having a plurality of items, the list is browsed in the touch-sensitive display unit in one dimension, and the deformation of the data is a one-dimensional enlargement of the list.

4. A system for displaying and moving data for use in an electronic device, comprising:

a touch-sensitive display unit displaying data; and a processing unit detecting a movement of an object on or near the touch-sensitive display unit, and in response to the movement, moving the data displayed in the touch-sensitive display unit in a movement direction of the object, and determining whether the object is still detected on or near the touch-sensitive display unit, and whether an edge of the data has been reached while the data is moving, detecting if the object is still on or near the touch-sensitive display unit when the edge of the data is reached while the data is moving, only when the edge of the data is reached and the object is still detected on or near the touch-sensitive display unit, deforming the data according to the movement direction of the object, and displaying the deformed data in the touch-sensitive display unit, detecting if the object is still on or near the touch-sensitive display unit after displaying the deformed data in the touch-sensitive display unit, and only when the movement of the object is no longer detected on or near the touch-sensitive display unit, restoring the deformed data, and displaying the data in the touch-sensitive display unit, wherein the deformation of the data is performed by enlarging a specific region from the edge of the data to a specific position corresponding to the object on or near the touch-sensitive display unit according to the movement direction of the object.

5. The system of claim 4, wherein the processing unit further expanding or magnifying the specific region according to a movement distance of the object after the edge of the data is reached.

6. The system of claim 4 wherein the data comprises a list having a plurality of items, the list is browsed in the touch-sensitive display unit in one dimension, and the processing unit deforms the data by enlarging the list in one dimension.

7. A non-transitory machine-readable storage medium comprising a computer program, which, when executed, causes a device to perform a method for displaying and moving data, and the method comprises:

displaying data in a touch-sensitive display unit of the electronic device;

detecting a movement of an object on or near the touch-sensitive display unit;

in response to the movement, moving the data displayed in the touch-sensitive display unit in a movement direction of the object;

determining whether the object is still detected on or near the touch-sensitive display unit, and whether an edge of the data has been reached while the data is moving;

detecting if the object is still on or near the touch-sensitive display unit when the edge of the data is reached while the data is moving;

only when the edge of the data is reached and the object is still detected on or near the touch-sensitive display unit, deforming the data according to the movement direction of the object, and displaying the deformed data in the touch-sensitive display unit, wherein the deformation of the data is performed by enlarging a specific region from the edge of the data to a specific position corresponding to the object on or near the touch-sensitive display unit according to the movement direction of the object;

detecting if the object is still on or near the touch-sensitive display unit after displaying the deformed data in the touch-sensitive display unit; and only when the movement of the object is no longer detected on or near the touch-sensitive display unit, restoring the deformed data, and displaying the data in the touch-sensitive display unit.

* * * * *